July 2, 1957      B. H. CARLISLE      2,798,170
MAGNETIC AMPLIFIERS AND CONTROL SYSTEMS
Filed July 7, 1954      2 Sheets-Sheet 2
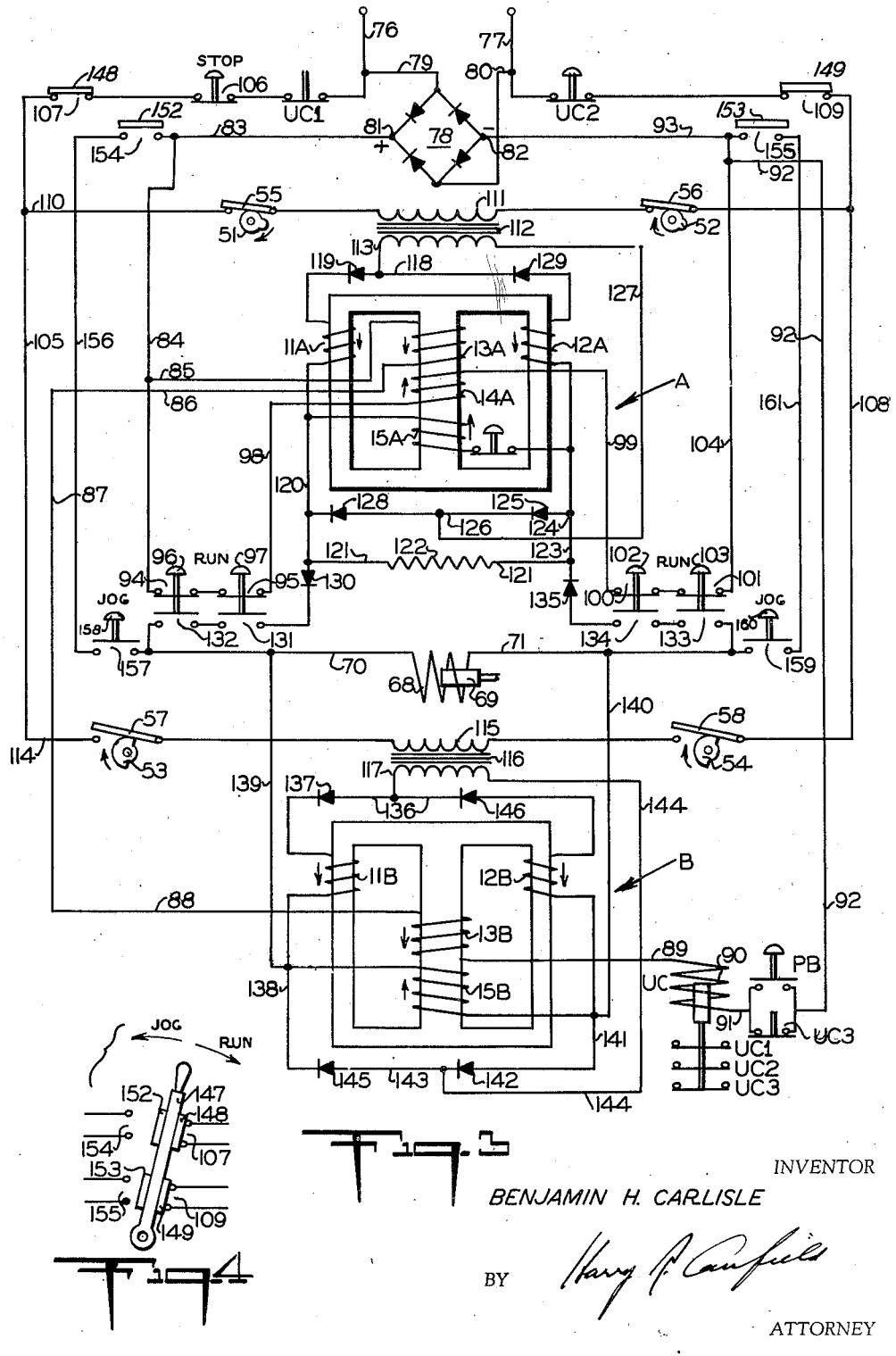
INVENTOR
BENJAMIN H. CARLISLE
BY
ATTORNEY United States Patent Office 2,798,170
Patented July 2, 1957

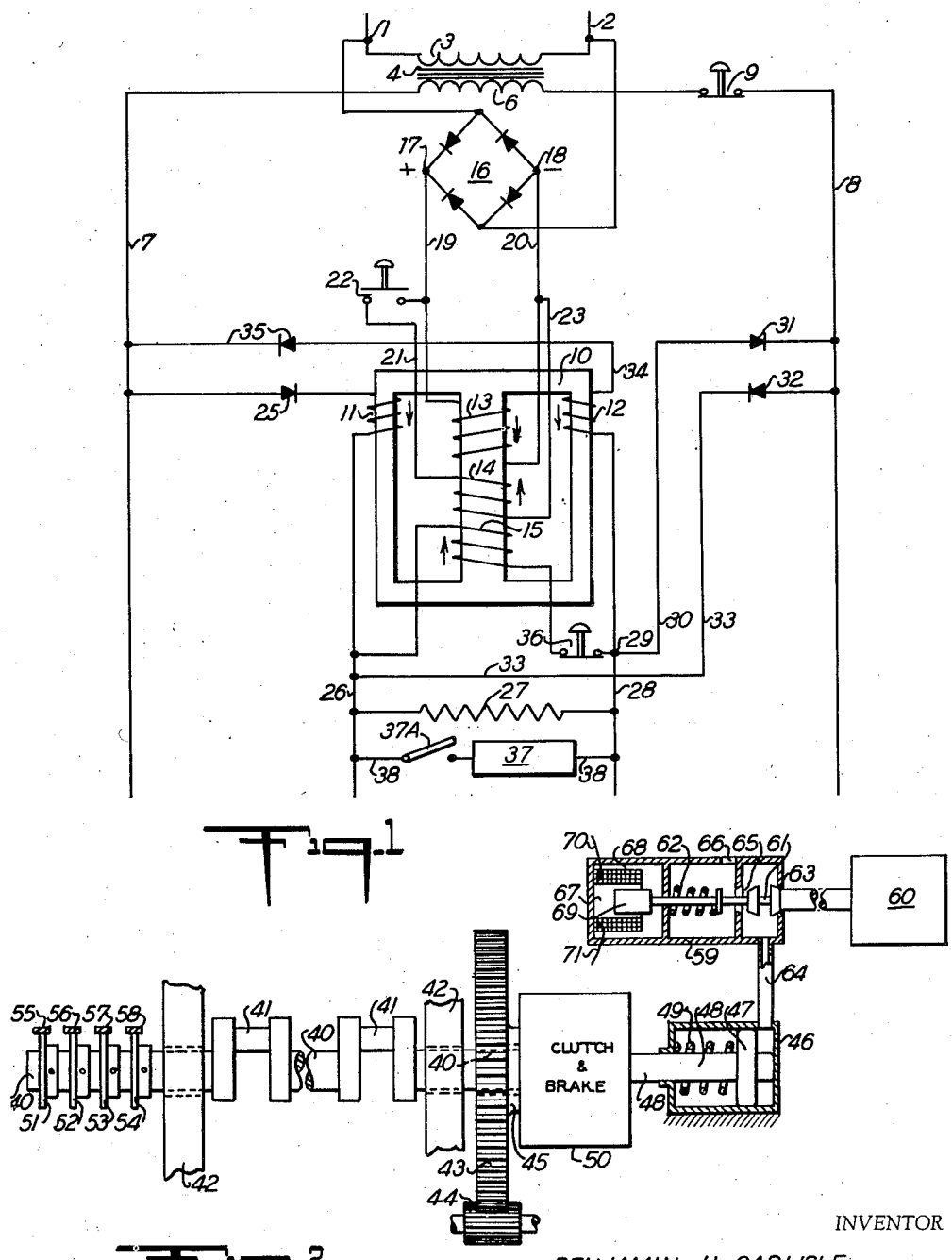

2,798,170

MAGNETIC AMPLIFIERS AND CONTROL SYSTEMS

Benjamin H. Carlisle, South Euclid, Ohio, assignor to The Clark Controller Company, Cleveland, Ohio, a corporation of Ohio Application July 7, 1954, Serial No. 441,703

22 Claims. (Cl. 307—112)

This invention relates in general to electrically operated control means for controlling electric current in a work circuit which contains an electrical work device to be energized by the current to activate or operate it, and deenergized to restore it; and relates particularly to such control means when the work device is of a type that must be activated by abruptly subjecting it to current of a predetermined high amplitude, and restored by abruptly reducing the current to zero, or substantially zero, amplitude.

Control of a work device by current having these characteristics, can be readily effected by prior devices, such as electromagnetic contactors which make and break the current on their contacts; but in many instances such contactors are undesirable, because of high original cost; and because of having mechanically moving parts; and because of being subject to deterioration by wear, and arcing at the contacts, and the consequent necessity of maintenance to insure continuous reliable operation.

According to the present invention the current to the work device is controlled to have the aforesaid characteristics without the disadvantages of contactors and the like, by a device of the magnetic amplifier class, sometimes called a transductor, having an improved mode of operation.

A transductor of well known or conventional type comprises in general a pair of main windings on a magnetic core, and in a circuit arrangement comprising rectifiers, by which the main windings when connected to alternating current supply mains, alternately pass, respectively, half waves of current therethrough to a load circuit, as unidirection pulsating current.

The reactance of the main windings normally has a high value so that small output current flows through them to the work circuit.

Control windings are sometimes employed on the cores, that increase said reactance and decrease the normal output current to a still lower value.

Control windings are usually provided on the core which when energized more or less are capable of reducing the said reactance and therefore can raise the output current to a higher value or reduce it again to a lower value, in accordance with the variable degree of energization thereof.

In the transductor of the present invention control windings are provided in circuits controlled by control switches, and so arranged that upon momentary or temporary operation of a control switch, the current output rises abruptly to the maximum output value, and is automatically sustained at that value after the control switch is restored; and so that upon momentary operation of another control switch, the output current falls abruptly to a low value, which is a minimum or negligibly small value.

The transductor of the invention thus supplies to a work device in the output circuit, current having the aforesaid desired characteristics, under control of control switches, only momentarily operated, and no moving parts such as relays or the like are necessary to effect said abrupt changes of the output current.

Such a magnetic amplifier may be used to advantage in various arts.

In one particular art, namely the art of electrically controlled power operated presses, enormous simplification and improvement could be effected if the general principles of the conventional transductor were applied thereto, inasmuch as electric power press controls as developed over the years, comprise a multiplicity of magnetic contactors and circuits; auxiliary contacts; interlocking electric circuits; maintaining circuits; etc., all deemed necessary today, largely for purposes of safety to the operators of the press, and to protect the press itself from damage due to faulty operation; and these complications could be obviated if a transductor could be applied to control such presses; and it would seem that the application of a conventional transductor to press controls would be a simple and obvious matter, since transductors can deliver large current or small current and since the operation of the modern electric press control depends primarily on the reliable operation of a device in a work circuit that must be activated and restored respectively by current of high and low values.

But in attempting to substitute magnetic amplifier control for the present complicated magnetic contactor control of such presses as referred to, problems arise; the solution of which is not obvious and has led to the present invention.

In order that the said problems may be fully understood, it is in order to outline briefly herein the features of electric press control.

A continuously running electric motor is connected to the press, to operate it, by a clutch; and the press is stopped by a brake. When one goes on, the other goes off, and vice versa, and this is effected by a fluid pressure cylinder and piston device. Fluid pressure, usually air pressure, is admitted to and exhausted from the cylinder by an electromagnetic valve device. The winding of the valve device is thus the work circuit device, of the premises, to be energized by suitably large current to operate it, and to be cut off or de-energized, or its energization reduced to a negligibly low value to restore it.

Operation of the valve causes the brake to release and the clutch to set to start the press, and restoring of the valve causes the clutch to release and the brake to set to stop the press.

Operator's control push buttons are provided in a plurality of pairs, a pair for both hands of each of a plurality of operators; and only when all of the push buttons are closed, can the magnetic contactors cause the valve winding to be energized and the valve operated; and the push buttons are located remotely from the press to compel the operators to take up positions of safety.

The press operations are controlled cyclically by cam switches on the press main shaft.

These cam switches are timed to operate at certain points in the 360° complete cycle of the press, that is, a complete revolution of the press main shaft; and the operations of the cam switches are coordinated with the operations of the magnetic contactors by the push buttons, for purposes of safety to the operators.

To this end the push buttons must all be depressed to start the press, and all held depressed until the press has made about one half of its cycle. If any one is earlier released the press will stop. After the half cycle they can all be released and the press will start on the second half of its cycle. At the completion of the cycle, the press will stop.

If however the push buttons or any one of them has not been released the press will not start again and repeat the cycle, and cannot be started again on another cycle until all of the push buttons have first been fully released and all of them depressed again.

As indicated in the foregoing, the invention hereof was made to solve the problem of adapting the general principles of magnetic amplifiers to a press control to energize the electromagnetic air valve thereof with ample current to positively operate it to start the press; and to deenergize it or reduce its energization to zero or substantially to zero, to restore it to stop the press; and to effect control of the amplifier in coordination with the usual operator's push button switches and cyclically operated cam switches; and to thereby effect a great simplification of the control and reduce its initial and maintenance costs, without sacrificing any of its said essential features; and a part of the invention resides in such a press control.

A part of the invention also resides in the aforesaid improved magnetic amplifier or transductor itself as a unit, by which said adaptation to press control is made possible, the unit having other uses, however, in the various arts, of which press control is but an illustrative example, and not being limited to its said use in a press control.

The invention is fully disclosed in the following description taken in connection with the accompanying drawing in which:

Fig. 1 is a diagrammatic view of a magnetic amplifier constituting part of the invention;

Fig. 2 is a fragmentary view of a part of a power press, and a simplified showing of an electromagnetic valve device therefor, to control a clutch and brake thereof;

Fig. 3 is a diagrammatic view of a complete control for a power press including the valve device of Fig. 2; and the amplifier of Fig. 1; and constituting part of the invention; and Fig. 4 is a diagrammatic view of a selector switch, having contacts reproduced in Fig. 3.

Referring to Fig. 1 of the drawing, illustrating a preferred form of the magnetic amplifier unit referred to above as comprising in itself a part of the invention, there are shown at 1 and 2 alternating current supply mains, energizing the primary 3 of a transformer 4, the secondary 6 of which supplies A. C. potential to side mains 7—8 through a normally closed manual switch 9.

At 10 is a three-leg core having main reactor windings 11—12 on its outer legs and three control windings 13—14—15 on its middle leg, which will hereafter, at times, be referred to respectively as biasing; initiating or anti-biasing; and sustaining windings.

At 16 is a full wave rectifier connected across the mains 1—2 and having positive and negative output points 17—18; and the biasing winding 13 is permanently connected to the points 17—18 by wires 19—20 and is at all times fully energized thereby.

The initiating winding 14 is connected at one end to the rectifier point 17 by wires 19 and 21 through a self-opening, normally open manual switch 22 of known construction and at the other end is connected to the rectifier point 18 by wire 23, and wire 20, and is energized only when the self-opening switch 22 is closed, whereby its energization may be momentary or temporary.

Energization of the sustaining winding 15 will be described later.

The main reactor winding 11 is in a circuit from side main 7, through a rectifier 25, the winding 11 itself, a wire 26 which may be referred to as one output main, through a resistor 27, to a wire 28 which may be referred to as the other output main, to a point 29 on the wire 28 and thence by a wire 30 and rectifier 31 to the other side main 8.

The main reactor winding 12, is in a similar circuit, from side main 8, comprising a rectifier 32, wire 33, wire 26, resistor 27, wire 28, through the point 29 to and through the winding 12, and by wire 34 and a rectifier 35 to side main 7.

The said resistor 27 constitutes a preferably non reactive auxiliary load of fixed ohmic value across the output mains 26—28, and is a part of the unit, participating in its operation, as will be referred to.

The sustaining winding 15 is connected across the output mains 26—28 through a self-closing, normally closed manual switch 36.

From the foregoing, those skilled in the art will understand that the alternate half waves of the alternating current flow through the main windings 11—12 alternately and that the half waves flow always in the same direction through the resistor 27, namely, from wire 26 to wire 28; and, produce unidirection potential across the wires or output mains 26—28.

The initiating winding 14 and sustaining winding 15 are poled so that their magneto motive forces are both in the same direction; and in the same direction as that of the inductor windings 11—12; and the biasing winding 13 is poled in the opposite direction. The poling is indicated by arrows adjacent to the respective windings.

At 37 is a main load device which in practice is to be connected across the output mains 26—28 by wires 38 and a switch 37A; and in view of the premises, this is the load or work device to which, in accordance with corresponding values of potential on the mains 26—28, unidirectional current, is to be supplied, having the aforesaid characteristics, namely: normally at zero or negligibly low value; abruptly raised to a maximum high value and sustained at that value automatically; and abruptly reduced to said normal low value.

The mode of operation of the unit of Fig. 1 which will now be described, relates to developing said output potentials on the mains 26—28.

The biasing winding 13 is at all times fully energized.
The switch 9 is normally closed and the transformer secondary 6 subjects the side mains 7—8 to alternating potential.

Alternate half waves of current flow through the windings 11—12 successively and flow as pulsating unidirectional current from output main 26 to output main 28, through the auxiliary load resistor 27, the switch 37A being open.

It will be apparent that a part of the voltage between the mains 7—8 will appear across each of the windings 11—12 in turn due to the reactance of the windings, and part will appear across the resistor 27, and the unidirectional potential across the output mains 26—28 will be the potential across the auxiliary load 27.

The effect of the constantly energized biasing winding 13, is to increase the reactance of the windings 11—12 to the maximum possible, so that the voltage across the mains 26—28 is at the minimum possible, and therefore the load device 27, subjected to this potential will have the minimum possible of current flowing through it.

In further explanation of these effects, the action of the biasing winding will for the moment be ignored as if it were absent. It is well known that no matter how high the reactance of, say, the winding 11 might be made by design (number of turns, etc.), some current even if very small will flow through it, and produce flux in the core within it.

The reactance of the winding in the direction to oppose the potential impressed upon it, results from the increase, or rate of increase, of the flux within it, by the well known law of induction.

When the impressed potential is an increasing potential as in the case of a wave of alternating current, the possible increase of flux will be greater, the farther down it is on the saturation curve when it starts to increase.

The flux within the winding produced by its own current, is a value on the saturation curve above the zero flux value; and the possible increase of flux, effective to produce reactance, starts from this higher point, and the reactance is made less thereby.

Now if we restore to the discussion, the biasing winding 13, which produces magneto motive force opposing that of the winding 11, it will reduce to the minimum the flux produced by the current in the winding 11, so that when flux in the winding 11 starts to increase it starts from the zero value or a minimum value on the saturation curve, and therefore the reaction is the maximum possible.

This effect of the biasing winding on the main winding is well known to those skilled in the art. In some instances, it has heretofore been referred to as a "compensating" winding; and those skilled in the art will know how to provide a main winding 11, the reactance of which (when the effect of the biasing winding is absent) will be any preselected portion of the impressed potential; and will know how to provide a biasing winding proportioned to such preselected main winding to produce the effect of maximum reaction in the main winding above described.

The above description applies also to the main winding 12.

The preselection of a suitable reactance for the windings 11 and 12 respectively, will be described later.

Continuing now the description of operation, it will be observed that at this time, the sustaining winding 15 is being energized across the output mains 26—28, with unidirectional current; and tends to produce flux in the core within the main windings 11—12; but the potential across the output mains is at a very low value as described, and the energization of the sustaining winding is so low that the effect thereof is negligible, and in any event, any flux therefrom in the main windings is or may be neutralized by the biasing winding 13 so that it has no effect on the reactance of the main windings.

When the operator wants to increase the potential abruptly to the said high value, according to the invention, he closes the control switch 22; and it may be closed only momentarily as will appear.

The initiating or anti-biasing winding 14 is thereby immediately energized with D. C. as described.

The magneto motive force of the winding 14, opposes that of the biasing winding 13 and is proportioned to approximately equal it and neutralize it.

The above described effect of the biasing winding 13 to increase the reactance of the main windings 11—12, is thereby discontinued; and their reactances respectively fall to a lower value, and a smaller portion of the applied potential accordingly appears across the main windings and a greater portion across the auxiliary load, that is, across the output mains 26—28.

Main windings 11—12, are chosen to have at this time a preselected relatively low reactance, and in the preferred practice of the invention, it will be preselected to be about one half of the impressed potential, say 40% to 50% thereof. A part of this reactance will be due to the flux produced within the main windings themselves by the current flowing in them as has already been described. The value of this current, will depend upon the resistance value of the auxiliary load 27, and it will therefore be preset or arrived at by adjustment in a well known manner, to a value that in combination with the physical values of the main winding (turns, etc.) will cause the reactance potential thereof to be greatly reduced as aforesaid and approximately to one half of the impressed potential.

The value of the load resistance 27 is therefore not critical. The preferred way to arrive at a suitable value for the practice of the invention is to make it approximately equal to the total impedance of the work load device 37 which is to be energized by the output potential.

The potential across the output mains now having risen to a high value, energizes the sustaining winding 15 to a high enough value to cause it to raise the flux in the main windings 11—12 toward saturation.

This as explained above reduces the reactance of the main winding, and the potential thereacross decreases and that across the output mains 26—28 correspondingly increases, and the sustaining winding 15 is thereby energized still more highly, and increases still more the flux in the main windings 11—12; and this cyclical action goes on until the core in the windings 11—12 is substantially fully saturated; whereupon the reactance of the windings 11—12 and the potential thereacross substantially disappears and the unidirectional potential across the output mains 26—28 rises to a maximum value, substantially that of the applied potential, and concurrently maintaining the sustaining winding 15 fully energized.

This action, upon closing the switch 22 occurs very quickly, so that the rise of potential to the maximum value is properly described as abrupt. The closure of switch 22 need therefore be only momentary.

When the operator wants to abruptly lower the output potential to said low value he may do so by momentarily opening the switch 36 to deenergize the sustaining winding 15. Saturation thereupon is terminated.

The initiating or anti-biasing winding 14 being already deenergized by opening of the switch 22, after its momentary closure, the only control winding now energized is the biasing winding 14. The reactance of the main windings 11—12 is therefore increased to maximum by the permanently energized biasing winding 13 and the potential on the output mains 26—28 falls, and falls abruptly to the low value.

The aforesaid maximum and minimum potentials of the output mains will obviously be impressed upon the work device 37 upon closing the switch 37A, and the work device will be supplied with the maximum and minimum current of the premises. To give the work device maximum current, the switch 22 is momentarily closed. To give it minimum current, either the switch 36 or the switch 9 is momentarily opened. To give it zero current the switch 9 is opened and held open.

Thus the purposes of the invention are accomplished as set forth in the premises.

Certain advantages of the amplifier of the invention appear more clearly when they are compared with a conventional amplifier of the same transductor class; which conventional transductor may be defined as one having main inductor windings, which because of reactance normally supply a low output, and a control winding to saturate their cores when a high output is wanted.

The amplifier herein described is adapted to momentary operation of the control switches, which in many instances is a pre-requisite. To energize the saturating winding of the conventional amplifier, a control switch must be closed and maintained closed as long as high output is wanted, or, a relay would have to be provided, operated by momentary closure of a control switch and maintaining itself closed thereafter, and this would introduce objectionable moving parts as referred to.

The saturating winding of the conventional amplifier must be energized with D. C. preferably obtained from a rectifier, and the rectifier must supply all of the current to the winding and the winding must be of large size to produce the saturation; both of which because of size add to the original cost.

In the present amplifier, to effect saturation, a rectifier supplies small D. C. to energize the initiating or anti-biasing winding; and the winding is small and the rectifier is accordingly small, both inexpensive.

The saturating winding, here the sustaining winding 15, likewise is small and inexpensive because it is energized by unidirectional current derived directly from the A. C. supply mains at high voltage.

The output potential of the present amplifier is in effect, the IR potential across an auxiliary load resistor; and high output potential is produced by large current in the resistor. This high current flows through the main inductor windings and aids in saturating them. Whereby the saturating winding may be made still smaller and cheaper as having less to do to produce saturation.

A biasing winding is provided to effect low output and has no control switch to energize and deenergize it but is permanently energized, and therefore always ready to restore the main windings to high reactance and low output, automatically, and is not subject to being deenergized except upon failure of the main supply.

The rise of current in the work device in the load circuit to said high value, and its fall to the low value, and vice versa, is, as described herein, abrupt, as distinguished from a gradual rise or fall. When the necessarily large control winding heretofore employed is energized to saturate the core and deenergized to allow the saturating to decay, the inductance of such a control winding delays the change of flux and the said high and low values are arrived at gradually and not abruptly.

The biasing winding is rendered effective to perform its function, and rendered ineffective to do so, as described, by the momentary operation and immediate restoring of control switches which also perform other functions, and not by opening and closing its own circuit; and the control of its action therefore does not depend upon the operation of control switches provided especially and additionally for it, the operation of which would have to be timed to coordinate its action with other actions in the amplifier, if the amplifier is to change its output from low to high and vice versa, abruptly, which is one of its important functions.

Coming now to the application of the invention to a press control, as referred to, reference may first be made to Fig. 2 which illustrates part of a press mechanism.

The main shaft 40 of the press is provided with cranks 41 to reciprocate the press head, in a well known manner, and is rotatably supported in bearings on the main frame 42; and has a gear 43 with a hub 45, normally rotated idly on the shaft by a motor pinion 44.

A pneumatic cylinder 46 supported on the main frame of the press has a piston 47 therein with a piston rod 48 projecting therefrom. The piston is normally retracted by a spring 49.

The gear hub 45 and piston rod 48 project into a brake and clutch mechanism indicated diagrammatically at 50. The mechanism comprises elements by which when the piston 47 is retracted by the spring 49, a brake grips the shaft 40 and stops the press; and by which when the piston rod is projected forwardly, by fluid pressure behind it, the brake is released and the hub 45 is connected to the shaft 40 by a clutch, to cause the gear to drive the shaft and the press; the clutch being released when the piston rod 48 is retracted.

A more complete showing of such a mechanism may be found in the patent to Colbert 2,133,161, October 11, 1938.

On the free end of the press shaft 40 are mounted cams 51 to 54 that rotate with the shaft and operate cam switches 55 to 58, to open and close them; and the cams are adjustable around the shaft to cause them to operate the switches at selected points in the press cycle.

A valve housing 59, communicates with a source 60, of air pressure; and has a valve element 61 reciprocable to a normal position by a spring 62 to close an inlet port 63, to cut off the air pressure supply from a conduit 64, leading to the cylinder 46; and to open an exhaust port 65 which connects the cylinder conduit 64 to an exhaust 66; and the valve element 61 is reciprocable in the other direction by an electromagnet 67 having a winding 68, and a plunger 69 connected to the valve element 61.

When the magnet winding 68 is energized to a sufficiently high value, the plunger 69 overpowers the spring 62 and moves the valve element 61 to close the exhaust port 65 and open the inlet port 63; and air pressure from the source 60 then flows through the conduit 64 into the cylinder 46 behind the piston 47, and the piston is projected forwardly against the opposition of the spring 49, and the piston rod 48, projected forwardly with it, operates the clutch and brake mechanism 50 to release the brake and set the clutch to drive the press.

When the magnet winding 68 is de-energized or energized to a negligibly low value, the valve spring 62 moves the valve element 61 to the position shown at which it closes the inlet port 63 and opens the port 65 and exhausts the cylinder 46 through the conduit 64, port 65 and exhaust outlet 66; and the cylinder spring 49 then retracts the piston 47 and rod 48 to the position shown, and thereby the spring sets the brake and releases the clutch, and stops the press.

The magnet winding 68 has an energizing circuit represented in Fig. 2 by wires 70—71.

In Fig. 3 which will now be described and which illustrates the application of the improved amplifier above described to a press control, the cam operated switches 55, 56, 57, 58, usually referred to as limit switches, and the corresponding cams 51, 52, 53, 54 are reproduced from Fig. 2, with the same reference characters, to identify them.

The air valve operating electromagnetic device of Fig. 2 is also indicated as being reproduced in Fig. 3, by the winding 68 and plunger 69, and by the energizing circuit therefor, comprising the wires 70 and 71; these parts having the same reference characters as in Fig. 2.

Shown generally at A is an amplifier unit, substantially like that described for Fig. 1, with reference characters the same as those for corresponding parts of Fig. 1 but with the suffix A, and a brief description thereof here and hereinafter, will therefore suffice.

It has main windings 11A—12A; a biasing winding 13A; an initiating or anti-bias winding 14A; and a sustaining winding 15A.

At B is shown generally another amplifier unit, like the unit of Fig. 1, and with the same reference characters for corresponding parts but with the suffix B, and a brief description thereof will also suffice. It has main windings 11B and 12B; a biasing winding 13B; and sustaining winding 15B. An initiating winding as such being unnecessary in this unit, is not shown. These windings of units A and B are poled to develop magneto motive forces in the same direction as the corresponding windings of Fig. 1 as indicated by the arrows adjacent thereto.

At 76—77 are A. C. supply mains. A rectifier 78 is connected across the mains 76—77 by wires 79—80, as a source of D. C.

As illustrated in Fig. 3, and as will further appear hereinafter, some of the circuits are energized; the units A and B are partly energized; unidirectional potential is being developed across output mains of the unit A (to be referred to); and the whole system of Fig. 3 is in a stand-by condition ready to be operated to start and operate the press; and this condition will hereinafter be referred to as the "normal" condition of the system of Fig. 3 and its parts.

The biasing windings 13A and 13B are to be always energized by D. C. and to this are connected in series in a circuit across the positive and negative output points 81—82 of the rectifier 78 as follows: from the positive point 81 of the rectifier 78; by wires 83—84—85; the biasing winding 13A; wires 86, 87, 88; the biasing winding 13B; wire 89; the winding 90 of an undercurrent relay UC; a wire 91; through closed contacts UC3 of the relay UC; wires 92 and 93; to negative point 82 of the rectifier.

It is intended that, to energize the biasing windings 13A—13B, by this circuit, the push button PB is to be first operated, to complete the energizing circuit on its contacts; and that the biasing winding current will then flow; and that the biasing winding current will then operate the relay UC by its winding 90. The relay will then close its contacts UC1, UC2, and UC3; and the contacts UC3 will close a maintaining circuit for the relay winding; and the push button PB is then intended to be released and open its contacts.

The winding 90 of the relay UC, is proportioned so that the relay will remain operated only so long as the biasing windings 13A—13B in series with it are fully energized. If the energization of the biasing windings should, due to any cause, become reduced, or should fail entirely, the relay UC would thereupon be immediately restored and open its contacts. The contacts UC1 and UC3 are reproduced elsewhere in the system and will be shown to be in the line of supply of the A. C. to the system so as to cut it off if they should open; with the result of de-energizing the air valve magnet 68 and stopping the press.

Again, the biasing windings are energized with D. C. as described. If however one of the main windings 11A—12A; or 11B—12B; the current in which is pulsating unidirectional current as will become more apparent, should develop a fault and become unbalanced, a low frequency potential would be generated thereby in the biasing winding circuit, causing the energization of the winding 90 of the relay UC to have successive low values, and the winding as described being sensitive to less than a predetermined energization, would then cause the relay to restore on one of said low values and open its contacts with the described result of cutting off the main current supply.

The biasing windings function in some respects as protective windings and it is for this reason that the relay UC is provided.

The initiating winding 14A of the unit A is connected to be energized with D. C. from the rectifier 78 by a circuit comprising wires 83—84; the normally closed contacts 94—95 of a pair of operator switches 96—97 of the push button type; a wire 98; the initiating winding 14A; a wire 99; normally closed contacts 100—101 of another pair of operator push button switches 102—103; wires 104, and 93.

The circuits of other windings of the units A and B will be described as the general description proceeds.

The A. C. supply line 76 continues into a diagram side line 105 through normally closed contacts UC1, above referred to; normally closed contacts of a manual switch 106; and normally closed contacts 107 of a selector switch to be described; and the A. C. supply line 77 similarly continues to a side line 108 through normally closed contacts UC2, above referred to; and normally closed contacts 109 of the selector switch.

Connected across the A. C. side lines 105 and 108 is a cross line 110 having in series therein the aforesaid cam switch 55, normally closed; the primary 111 of a transformer 112; and the aforesaid cam switch 56 normally closed. The transformer has a secondary 113 connected with the unit A.

Connected to the side lines 105—108 is a cross line 114 having in series therein the aforesaid cam switch 57, normally open; the primary 115 of a transformer 116; and the aforesaid cam switch 58, normally open. The transformer 116 has a secondary 117, connected to the unit B.

As to the circuits of the main windings 11A—12A of the unit A, under said "normal" conditions: alternate half waves of current in the normally energized secondary 113 flow to a wire 118; through a rectifier 119; and main winding 11A; to one output main 120; by wire 121 through an auxiliary load resistor 122 (corresponding to the resistor 27 of Fig. 1); to the other output main 123; to a point 124; through a rectifier 125; and by wires 126 and 127 back to the secondary 113.

Similarly, as to the main winding 12A, the other half waves in the secondary 113 flow by wires 127 and 126 through a rectifier 128; to output main 120; thence by wire 121 and resistor 122 to output main 123; and thence beyond the point 124 through main winding 12A; and a rectifier 129; and wire 118; to the other side of the secondary 113.

The sustaining winding 15A is connected across the output mains 120—123.

The output main 120 is connected through a blocking rectifier 130; and through normally open contacts 131 and 132 of the push button switches 96 and 97; to wire 70 of the valve magnet circuit; through the magnet winding 68; to wire 71 of the magnet circuit; to normally open contacts 133—134 of the aforesaid push button switches 101—102; through a blocking rectifier 135; to the output main 123.

At the unit B, the transformer 116 is normally de-energized by the normally open cam switches 57—58 and the main windings 11B—12B receive no current from the secondary 117.

Subsequently, at a point in the cycle of the press to be described, the switches 57 and 58 will close, and energize the transformer secondary 116; and then, similarly as in unit A, current will flow from the secondary 117 during alternate half waves, over the following circuit: wire 136; rectifier 137; main winding 11B; to a wire 138 which will then be an output main 138; wire 139; wire 70; through the valve magnet winding 68; wire 71; wire 140; to wire 141 which will then be an output main 141; a rectifier 142; wire 143; and wire 144 back to the secondary.

There will then be a corresponding circuit for the main winding 12B as follows: from secondary 117; to wires 144—143; rectifier 145; output main 138; wire 139; valve magnet wire 70; winding 68; wire 71; wire 140 to output main 141; winding 12B; rectifier 146; wire 136; to the secondary 117.

At this point in the description however the cam switches 57—58 have not yet closed and this action is not occurring.

The sustaining winding 15B of the unit B is connected across the output mains 138—141.

The aforesaid selector switch is illustrated in a diagrammatic form in Fig. 4 and comprises a pivoted arm 147 carrying insulated bridging contacts 148—149 on one side, for bridging corresponding pairs of stationary contacts 107—109 when rocked clockwise to a "run" position; and opposite bridging contacts 152—153 for bridging pair of contacts 154—155 when rocked counterclockwise to a "jog" position.

In the "normal" condition of Fig. 3, it is ready to be operated to drive the press or cause it to "run," and the selector switch is in its "run" position and its contacts 107—109 are closed as already described for the top cross line of Fig. 3.

There is a circuit from the recitifier 78 by wire 83, through the said normally open "jog" contacts 154 of the selector switch and by wire 156 to normally open contacts 157 of a push button jog switch 158 to and through the valve magnet circuit 70—68—71 to normally open contacts 159 of another push button jog switch 160; thence by a wire 161 through aforesaid normally open contacts 155 of the selector switch and wire 93 to the rectifier 78, to be referred to.

A description of the operation of Fig. 3 follows:

In the said "normal" condition, the cam switches 55—56 are closed, and the transformer secondary 113 is supplying alternating potential to the unit A. The cam switches 57—58 are open. The biasing windings 13A—13B are fully energized.

The push button switches 96—97, 102—103 are in their upper positions, and therefore the initiating winding 14A is energized, through their upper contacts. Under these conditions it will be understood, from the foregoing description of Fig. 3 and the description of operation of Fig. 1, that potential is developed on the output mains 120—123, and that the sustaining winding 15A is fully energized.

If any one of the push buttons 96—97, 102—103, is not in its fully released position shown, and any of their contacts 94—95—100—101 is open, the circuit of the initiating winding 14A will be open, and the action of the biasing winding 13A will hold the potential on the output mains 120—123 at a low value; but when said contacts are all closed, even momentarily, the initiating winding will act and the potential on the mains will rise at once to said high value and be sustained by the sustaining winding, independently of the push buttons.

The push buttons may therefore be depressed and open one or all of the contacts 94, 95, 100 and 101 without disturbing the high potential on the output mains 120—123.

It is one of the important features of the invention that high potential will appear across the output mains 120—123 upon only momentary closure of the circuit of the initiating winding 14A.

The push buttons may now be depressed to close their lower contacts 131—132—133—134. Current under said high potential will instantly flow between the high potential mains 120—123 at high current value through these lower contacts and in the valve winding circuit 70—71 and energize the valve winding 68 abruptly with high current and it will operate as described to start the press on its 360° cycle.

At the same time, current will flow at high potential, and in parallel with the winding 68, through the wires 139—140 and energize the sustaining winding 15B of the unit B.

The sustaining winding 15B acts at this time like an initiating winding, and, neutralizing the effect of the biasing winding 13B, reduces the reactance of main windings 11B and 12B, so that as soon as the secondary 117 supplies potential to the unit B, high potential will appear across the output mains 138—141 of unit B, and it will sustain high energization of the winding 15B; and the high potential will be applied through the wires 139—140 in the other direction from that described, to the valve winding 68.

At the present time however the transformer secondary 117 is not supplying current to the unit B, the primary being open at the cam switches 57—58.

The push buttons 96—97, 102—103 must be maintained depressed until the press runs about 180° of its cycle for aforesaid safety purposes. If any one of them is earlier released, deenergization of the valve winding 68 will occur and the valve device (Fig. 2) will restore and stop the press.

When the press cycle has gone to or beyond the safety point, the cam switches 57—58 close. This energizes the transformer 116 and its secondary supplies A. C. to the unit B with the result above described; and the unit B as will be understood, then takes over the function of energizing the valve winding 68 at high potential; jointly with the unit A.

The push buttons 96, 97, 102, 103 may now be released, and the unit B will continue, alone, to energize the valve winding with high current.

The press therefore continues its cycle in the latter half thereof. When the cycle has been completed the cam switches 57—58 will return again to their normally open positions, and this, by cutting off the transformer 116, will deenergize the unit B, so that it will stop supplying current to the valve winding 68.

Also, assuming that the push buttons 96, 97, 102—103 have been released, as they would be in normal operation, the unit A has already stopped supplying current to the valve winding. Thus when the cam switches 57—58 open at the end of the cycle, the current to the valve winding is abruptly terminated and the valve device restores and stops the press.

However, by inadvertence, the push buttons may not have been released, after the cam switches 57—58 closed, as described.

In such event, and in the absence of countervailing provisions, the valve winding 68 would continue to be energized by the unit A, after the cam switches 57—58 opened, and the press would, unexpectedly, begin another cycle, with liability of injury and damage.

To avoid this, the cams of the cam switches 55—56 are formed so as to open these switches and close them again during a few degrees of the press shaft rotation; and are timed so that this occurs near the end of the cycle.

When this occurs it deenergizes the secondary 113 of transformer 112; and all energization of the unit A is cut off except the energization of the biasing winding 13A. The unit A then stops supplying current to the valve winding 68. When the cam switches 55—56 close again, after their momentary opening, the initiating winding 14A will not be energized, being open at the push button contacts 94—95, 100—101, because of the inadverently depressed push buttons, or some one or more of them; and the biasing winding 13A being energized, it performs its function of keeping the reactance of the winding 11A—12A so high that only the said low potential can develop on the output mains 120—123 (as described hereinbefore); and current flowing through the lower contacts of the push buttons can energize the valve winding with only a negligibly low value so that the valve device cannot be maintained operated and it restores and stops the press.

The cam switches 55—56 having closed again after their momentary opening; then when the push buttons 96—97, 102—103 are ultimately released, and if all of them are released, the initiating winding 14A will again be energized and restore the output voltage to its "normal" high value; but this cannot now be applied to the valve winding 68 because the lower contacts of the push buttons are now open.

This cutting down of the output of unit A as a safety feature, when the push buttons or any one or more of them are inadvertently held down, would be defeated (in the absence of countervailing provisions) by the unit B.

At the unit B, the cam switches 57—58 have not yet opened, and the unit is delivering high potential to the valve winding circuit at lines 70—71; and current therefrom could flow through the contacts 132, 131 to the sustaining winding 15A and back therefrom through the contacts 133—134, and keep the sustaining winding 15A, of unit A, energized, independently of the momentary opening and closing of cam switches 55—56; so that the output of unit A would remain high, after the cam switches 55—56 opened and closed as described.

This is prevented however by the rectifiers 130—135 which block flow of current through the sustaining winding 15A from the unit B as just described.

As is well known in press operation, it is desirable at times to cause the press to move in the direction of its cycle but through only a small part thereof, and then stop; such intermittent operation being known as "jogging;" and it is desirable to be able to jog at any point in the complete cycle. This is provided for in Fig. 3 as follows.

The selector switch, Fig. 4, is first moved to the jog position. This as described, opens the run contacts 107—109 reproduced at the top of Fig. 3, cutting off the A. C. supply and also closes the jog contacts 154—155 which in Fig. 3 complete the described circuit from the rectifier through contacts 154; wire 156; open contacts 157 of a push button jog switch 158; wire 70; valve winding 68; wire 71; open contacts 159 of a push button jog switch 160; wire 161; closed contacts 155; wire 93; back to the rectifier.

The jog push buttons 158—160 when both are closed give current directly to the valve winding 68, actuating it to operate the air valve and start the press; and upon opening either of them the winding 68 will be deenergized and the press will stop as will be understood. Jogging is therefore independent of the units A and B and since it is also independent of the cam switches 55 to 58, can be performed at any point in the cycle of the press.

In Fig. 3 only two pairs of push buttons 96—97 and 102—103 have been shown, contemplating operation by only two operators. Any desired number of operators may attend the press and operate the control and be subject to the aforesaid safety features, by providing a corresponding number of pairs of push button switches and contacts, identical with those illustrated, and with their upper contacts all connected in series and their lower contacts all connected in series, in the same sense as the upper and lower contacts of those shown, and it is believed that this will be understood without further description.

The operation of the press may be stopped at any time, by opening the contacts of the stop switch 106.

Thus operation of the press, with all of the features of control deemed necessary in electrical press control, is effected by the amplifier system of Fig. 3; and the simplification over prior systems referred to hereinbefore, by eliminating electromagnetic contactors, may be seen by reference to Fig. 4 of patent to Colbert 2,133,161, October 11, 1938, which illustrates a press control of the latter type many of which are in successful operation.

The form of the magnetic cores illustrated for the amplifier of Fig. 1 and the two amplifiers A and B of Fig. 3, is not essential and has been chosen to simplify the drawing. Other forms heretofore utilized in magnetic amplifiers, with the windings thereon suitably disposed, may be used, as will be understood by those skilled in the art.

The sustaining winding 15B of the second unit B, was highly energized in the first place, by being directly connected to the maximum potential of the work circuit 70—71 impressed on it by the unit A; and when the second timed switches, 57—58 closed the energizing circuit of the unit B, the sustaining winding 15B became, in effect, a saturating winding for the unit B, and caused maximum potential to develop on the output mains 133—141 of the unit B, which maintained the winding 15B in maximum energized condition, which in turn maintained maximum potential on the output mains 138—141; so that the unit B was able to fully energize the work device and keep it operated after the potential from the unit A was cut off therefrom, as described.

If due to any accidental cause, the second timed switches 57—58 should fail to close the energizing circuit of the unit B, then when the potential from the unit A is cut off, cutting off potential to the unit B, the output from the unit B would fail and the work device would restore and stop the machine.

Further, just before the second timed switches 57—58 open the second energizing circuit, the potential on the second output mains 138—141 is at the maximum as described. When the second timed switches open, and deenergize the second energizing circuit, the potential on the output mains falls to zero. This deenergizes the work device to restore it and stop the machine, and also completely deenergizes the sustaining winding, since it is not now receiving energization from the unit B.

If due to any accidental cause, energization of the energizing circuit of the unit B, should again be caused to occur, it would energize the unit B with the biasing winding 13B on alone, and the potential on the output mains, as explained hereinbefore would be at a negligibly low value, too low to energize the sustaining winding 15B to an effective value, and too low to energize the work device to operate it, and the device would remain restored.

It is desirable therefore for both biasing windings to be at all times energized. This is done by connecting them in series, so that if one fails, both will fail; and if either fails, the relay UC will restore and open its contacts UC1 and UC2 and cutoff all power at the alternating current mains, which, obviously, will restore the work device and stop the machine.

Subject matter illustrated and described herein but not claimed is being claimed in my copending patent application Serial No. 491,900 filed March 3, 1955, Div. 26.

I claim:

1. An electric controller comprising input mains at constant potential, and supplying potential to output mains normally at a minimum value; the controller comprising a control for varying the output potential; the control comprising a normally open and a normally closed control circuit; the controller constructed to respond to momentary closing of the normally open control circuit to thereupon abruptly raise the output potential to a maximum value, and maintain it at that value upon again opening the circuit; and constructed to respond to momentary opening of the normally closed control circuit to thereupon abruptly lower the output potential to said normal minimum value and maintain it at that value upon again closing the circuit; means to supply energization to the control circuits; and control switch means comprising contacts for effecting opening and closing of the control circuits directly on the contacts.

2. In a current controller a pair of reactor windings on respective cores; the windings connected to alternating potential mains through rectifiers and connected to a pair of output mains to supply unidirectional potential to the output mains; control winding means and means to energize the same unidirectionally and being disposed to exert a first influence on the core flux in the reactor windings, to cause the potential of the output mains to be at a high value; a first operable switch which in restored condition directly controls energization of the control winding means, and which upon momentary operation thereof, exerts a second influence on the flux of the reactor windings to cause the potential of the output mains to fall abruptly to a low value and which upon immediately restoring again does not thereupon again influence the flux; a second operable switch directly controlling energization of the control winding means and which upon momentary operation thereof exerts said first influence on the flux of the reactor windings to cause the potential of the output mains to abruptly rise to said high value, and which upon immediately restoring again does not again influence the flux.

3. In a current controller a pair of reactor windings on respective cores; the windings connected to alternating potential mains through rectifiers and connected to a pair of output mains to supply unidirectional potential to the output mains; control winding means and means to energize the same unidirectionally and being disposed to exert a first influence on the core flux in the reactor windings, to cause the potential of the output mains to be at a high value; a first operable switch which in closed condition directly controls said energization of the control winding means, and which upon momentary opening thereof, exerts a second influence on the flux of the reactor windings to cause the potential of the output means to fall abruptly to a low value and which upon immediately closing again does not thereupon again influence the flux; a second operable switch directly controlling energization of the control winding means and upon momentary closure thereof exerting said first influence on the flux of the reactor windings to cause the potential of the output mains to abruptly rise to said high value, and which upon again immediately opening does not thereupon again influence the flux.

4. An electric controller comprising a core and a pair of reactor windings thereon, connected across an alternating potential supply and through rectifiers, and to a pair of output mains to supply unidirectional potential across the output mains; a source of unidirectional potential; windings on the core comprising: a biasing winding wound in opposition to the reactor windings and always energized from the source; and causing the output potential to be normally at a minimum value; an anti-biasing winding connected to the source through a first control switch in opposition to the biasing winding; a sustaining winding wound in the same direction as the anti-biasing winding and connected to be energized at the potential of the output mains; the controller responding to energization of the anti-biasing winding, effected by momentary closure of the first control switch, to cause the output potential to rise and correspondingly increase energization of the sustaining winding, and responding to the resulting increased energization of the sustaining winding to cause the output potential to go on rising to a maximum value, and be maintained at that value; the controller responding to momentary de-energization of the sustaining winding to cause the output potential to fall to said minimum value; and a second control switch operable to de-energize the sustaining winding.

5. The controller described in claim 4 and in which the second control switch is in the circuit of the sustaining winding; and the controller responds to cause the output potential to fall to said minimum value and be maintained thereat, upon momentary opening of the second control switch.

6. The controller described in claim 4 and in which the second control switch is in the path of alternating potential supply to the reactor windings, and the controller responds to cause the output potential to fall to said minimum value and be maintained thereat, upon momentary opening of the second control switch.

7. An electric work circuit containing a normally restored work device; an electric controller for abruptly supplying unidirectional current to the circuit to actuate the device, and for abruptly cutting off the current to effect restoring of the device; the controller comprising a first and a second magnetic amplifier unit, energized from alternating current supply mains and supplying unidirectional potential to a first and a second pair of output mains of the respective amplifiers; two-way operable switch means, effective, when operated one way, to connect the first output mains to the work circuit through the switch means to energize the device with actuating current to cause it to operate; connections directly connecting the second output mains to the work circuit to concurrently energize the device with actuating current; said switch means effective when operated the other way, to disconnect the first output mains from the work circuit, whereby the second output mains alone energize the work device with actuating current and maintain it operated; and delayed operation contactor means operable to discontinue supply of potential to the second output mains, to discontinue supply of actuating current to the work device, to cause it to restore.

8. An electric work circuit containing a normally restored work device; an electric controller for abruptly supplying unidirectional current to the circuit to actuate the device, and for abruptly cutting off the current to effect restoring of the device; the controller comprising a first and a second magnetic amplifier unit, energized from alternating current supply mains and supplying unidirectional potential to a first and a second pair of output mains of the respective amplifier units; two-way operable switch means, effective, when operated one way, to connect the first output mains to the work circuit through the switch means to energize the device with actuating current to cause it to operate; connectons directly connecting the second output mains to the work circuit to concurrently energize the device with actuating current; said switch means effective when operated the other way, to disconnect the first output mains from the work circuit, whereby the second output mains alone energize the work device with actuating current and maintain it operated; and delayed operation contactor means operable to discontinue supply of potential to the second output mains, to discontinue supply of actuating current to the work device, to cause it to restore; the first amplifier unit comprising control winding means energized from a unidirectional current source, and responsive to the energization of which the said potential supplied to the first output mains is at a high value; and responsive to the de-energization of which the said potential supplied to the first output mains is reduced to a negligibly low value; other delayed operation contactor means, effective when operated, to de-energize said control winding means, subject to continuance of said one way operation of the operable switch, whereby upon discontinuance of supply of current of device operating value to the device from the second output mains, the supply of current to the device by the first output mains will be insufficient to maintain it operated and it will restore.

9. The apparatus described in claim 8 and in which the two-way switch is rendered effective when subsequently operated in the said other direction, to cut off the negligibly low potential from the work circuit and to energize the said control winding means to cause the potential of the first output mains to return to said high value.

10. An electric device in a work circuit normally in restored condition; and an electric controller for applying unidirectional potential to the work circuit to energize the device to operate it, and for terminating the application of the potential to the circuit to de-energize the device to cause it to restore; a power operated cyclically operating mechanism; the controller comprising a first and a second magnetic amplifier unit; alternating current supply mains; the first and second units having respectively first and second input circuits energized from the alternating supply mains; and each unit comprising magnetic amplifier control windings and energizing circuits therefor and constructed so that when their control windings and input circuits are energized the units supply unidirectional output potential to a first and second pair of output mains of the respective units; the first and second input circuits arranged to be opened and closed by respective first and second timed switches operated by the mechanism at predetermined points of its cycle; the first timed switch being normally closed and the first input circuit normally energized and the second timed switch being normally open and the second input circuit being normally de-energized; a two position control switch having a normal first position to which it holds closed and holds open, first and second contacts, and operable to a second position in which it opens and closes the said first and second contacts respectively; a circuit from the first output mains to the work circuit by way of the said normally open second contacts, and a direct connection from the second output mains to the work circuit; the control switch when operated to its second position, connecting the first output mains to the work circuit, to apply output potential thereto to energize the device with current sufficient to operate it; the second timed switch timed to close, at a later point in the mechanism cycle, the energising circuit of the second unit to cause potential of the second output mains to also be applied to the work circuit to energize the device; the control switch when restored to its normal position, disconnecting the first output mains from the work circuit whereby the potential of the second output mains maintains the device operated; the second timed switch timed to open the second energizing circuit at the end of the mechanism cycle, to discontinue supply of unidirectional potential to the second output mains and to the work circuit, to de-energize the work device.

11. The apparatus described in claim 10 and in which the said control winding means of the first unit comprises a winding whose energization is derived from and sustained by continuously maintained, uninterrupted energization of the first energizing circuit, and the unidirectional potential supplied to the first output mains by the first unit is of high value when said winding is energized and falls to a low value when energization of the control winding is de-energized by de-energization of the first energizing circuit; and in which the first timed switch is timed to momentarily open and then close the first energizing circuit before the second timed switch opens as aforesaid, and the opening of the first timed switch interrupts energization of said control winding and upon again closing, again energizes the first energizing circuit; and the first output mains then supply potential at low value; and if at such time the control switch has not been returned to normal position, the control switch will supply low potential to the work circuit insufficient to maintain the device operated, and when the second timed switch opens at the end of the mechanism cycle, the insufficiently energized device restores.

12. An electric work circuit; an electric controller for supplying the work circuit with unidirectional current at high and zero amplitude alternately; the controller comprising a first and a second electromagnetic unit; each unit having a core and a pair of reactor windings thereon; alternating current supply mains; the pairs of reactor windings of the respective units connected in individual circuits to be individually energized from the alternating current mains through rectifiers, and the pairs of windings of the first and second units also connected respectively to first and second pairs of output mains to supply rectified unidirectional potentials thereto; a source of unidirectional potential; windings on the cores comprising: a biasing winding on each core wound in opposition to the corresponding reactor windings and the two biasing windings connected to the source of unidirectional potential; a sustaining winding on each core wound in the same direction as the corresponding reactor winding and connected to be energized by unidirectional potential of the corresponding output mains; an anti-biasing winding on the core of the first unit normally energized from the source of unidirectional current through normally closed contacts of a two-way control switch, having normally closed and normally open contacts; the work circuit being connected to the first output mains through the normally open contacts of the two-way switch when they are closed; and being directly connected to the second output mains; a first timed switch normally closing said individual energization circuit of the first unit, and a second timed switch normally interrupting that of the second unit; the first unit being responsive to said energization of the anti-biasing winding, to supply unidirectional potential to the first output mains and responsive to energization of the sustaining winding effected thereby, to cause the first unit to supply maximum potential to the first output mains, and maintain it at the maximum, independently of the anti-biasing winding; the two-way switch being operable to open its closed contacts and terminate energization of the anti-biasing winding and to close its open contacts to communicate the maximum potential of the first output mains to the work circuit, and to the sustaining winding of the second unit; the second timed switch being timed to close subsequently thereto and energize the second unit, and the second unit being responsive to said energization of its sustaining winding to supply maximum potential to the second output mains and to the work circuit; the first timed switch being timed to momentarily open and de-energize the first unit and its sustaining winding and the first unit then being responsive to the biasing winding alone to reduce the potential on the first output mains to a minimum potential; the second timed contactor being timed to thereafter de-energize the second unit and its sustaining winding to cause the output potential of the second mains and the potential impressed on the work circuit thereby to fall to zero potential; the first unit being responsive to restore the first output mains to normal maximum potential by operation of the two-way switch to open its closed contacts and thereby disconnect the work circuit from the first output mains and to close its normally closed contacts and energize the anti-biasing winding.

13. The apparatus described in claim 12 and in which at least one of the biasing windings is connected in series with the winding of a relay to maintain the relay normally operated, and the relay has normally closed contacts in the line of the alternating supply mains.

14. The apparatus described in claim 12 and in which the two biasing windings are connected in series and in series with the winding of a relay to maintain the relay normally operated, and the relay has normally closed contacts in the line of the alternating supply mains.

15. The apparatus described in claim 12 and in which blocking rectifier means is provided between the first and second units to prevent the flow of current from the second unit to the first unit.

16. In a control for the energization and de-energization of an electric device in an electric work circuit; a source of alternating potential; a source of unidirectional potential; a first and a second electric unit respectively deriving electric input from the alternating source by way of a first and a second energizing circuit; a cyclically operating timing mechanism; a timed contactor timed by the mechanism to open the second energizing circuit at the beginning of the cycle and to close it at an intermediate point of the cycle and open it at the end of the cycle; the units having respectively, first and second output mains; and comprising control winding means and control circuit means therefor, energized from the unidirectional source; and comprising main circuits including rectifiers by which unidirectional output potential is applied to the first output mains, of a value subject to control by the control winding means and circuit means; an operator-operable contactor having a normal position in which contacts thereof are closed and cause energization of control winding and circuit means of the first unit, responsive to which the first unit supplies potential to the first output mains at a maximum value and maintains it at that value independently of the operator-operable contactor; and the operator-operable contactor being operable to a position at which contacts thereof impress said maximum potential on the work circuit to operate the electric device; and connections by which said impressed potential of the first unit is also impressed on control winding and circuit means of the second unit; the second unit, when its energizing circuit is closed by the timed switch as aforesaid, being responsive to said energization of its control winding and circuit means, to supply potential to the second output mains at a maximum value and maintain it at that value independently of the said potential from the first unit, and being connected to impress said maximum potential on the work circuit concurrently with that impressed thereon from the first unit; the operator-operable contactor being restorable to said normal position to open the said closed contacts thereof, and interrupt the potential impressed from the first unit on the work circuit, leaving the work circuit subjected to said potential from the second unit alone; and the second unit being responsive to opening of the second energizing circuit by the timed switch to discontinue supply of potential to the work circuit to deenergize the device and cause it to restore.

17. The control described in claim 16 and in which another contactor timed by the mechanism is provided, timed to momentarily open and then close the first energizing circuit at a point near the end of the mechanism cycle; and to hold the first energizing circuit closed at other times; and in which, upon failure of the operator to restore the operator-operable contactor, and when the first energizing circuit is momentarily open, the first unit responds to the control winding and circuit means to apply unidirectional output potential to the first output mains at a negligibly low value, which, impressed on the work circuit by the still-closed contacts of the operator-operable contactor is too low to maintain the device operated; so that when the potential of the second unit applied to the work circuit is discontinued, the device will restore.

18. In a control system for controlling the energization and de-energization of a device; a source of D. C. and a source of A. C.; mechanical switch means operated by a cyclically operating mechanism at predetermined points in its cycle; operator's switch means operable and restorable at will; rectifying magnetic amplifier means arranged to receive energization from the A. C. source, and having control winding means arranged to receive energization from the D. C. source under control of the operator's switch means; the amplifier means having output circuit means connected to the device; the amplifier means constructed to respond to operation of the operator switch means to deliver unidirectional output current to the device, and to respond to operation of the mechanical switch means at an intermediate point in the mechanism cycle, to continue said delivery of unidirectional current to the device after restoring of the operator switch means, and to respond to operation of the mechanical switch means at the end of the mechanism cycle to discontinue delivery of said unidirectional current to the device.

19. In a control system for controlling the energization and de-energization of a device; rectifying magnetic amplifier means comprising power input winding means; control winding means; and output circuit means to which the device is connected; operator switch means operable and restorable at will; mechanical switch means operable by a cyclically operating mechanism at predetermined points in the mechanism cycle; the control winding means arranged to be energized upon operation of the operator switch means, and the amplifier means responding thereto to supply unidirectional potential from the output circuit means to the device to energize it; the amplifier means arranged to respond to operation of the mechanical switch means, at an intermediate point in the mechanism cycle, to continue said supply of unidirectional potential after restoring of the operator switch means; and the amplifier means arranged to respond to operation of the mechanical switch means at the end of the mechanism cycle to discontinue said supply of potential to de-energize the device.

20. In a control system, a first and a second magnetic amplifier each of the type comprising A. C. input circuit means to energize the amplifier, D. C. control winding and circuit means, rectifiers, and unidirectional output mains; a work circuit having an operable and restorable device therein; operator switch means operable to connect the work circuit to the output mains of the first amplifier to cause its output mains to apply potential to the work circuit to operate the device; a connecion also connecting the output mains of the second amplifier to the work circuit; a timed switch timed to operate after operation of the operator switch means and closing the energizing circuit means of the second amplifiers to cause its output mains to also apply potential to the work circuit through said connection; the operator switch means upon being restored interrupting the application of potential from the first amplifier to the work circuit; the timed switch timed to restore after a time interval following restoring of the operator switch means and causing cessation of application of potential of the second amplifier to the work circuit, to restore the device.

21. An electric device in a work circuit normally in restored condition; and an electric controller for applying potential to the work circuit to energize the device to operate it, and for terminating the application of the potential to the circuit to de-energize the device to cause it to restore; the controller comprising a first and a second magnetic amplifier; each amplifier having electric input winding means and control winding means and potential output mains; a plurality of operator switches operable and restorable at will; a power operated cyclically operating mechanism; a mechanical switch timed to be operated by the mechanism at an intermediate point in its cycle; energizing circuit means for the winding means, controlled by the operator switches and mechanical switch; the winding means and circuit means of the first amplifier arranged to cause it to respond to operation of the operator switches and to supply output potential to the work device to operate it; the winding and circuit means of the second amplifier arranged to cause it to respond to operation of the mechanical switch at the intermediate point of the mechanism cycle to also supply output potential to the work device, conditioned upon maintaining the operator switches in operated condition; the first amplifier being responsive to restoring of the operator switches to discontinue said supply of potential; the second amplifier being responsive to restoring of the mechanical switch at the end of the mechanism cycle to discontinue said supply of potential to the work device to cause it to restore.

22. In a control system, a first magnetic amplifier comprising rectifiers, and main winding means energized with alternating supply potential, and output mains; and comprising control winding means energized with unidirectional potential in a manner to cause the output mains to have unidirectional output potential thereon; a load device; operator switch means which, when operated, impress the output potential on the load device to operate it; a second magnetic amplifier comprising second rectifiers, and second main winding means, and second control winding means; and second output mains also connected to the load device; a timed switch timed to operate after the operator switch means has been operated and closing a circuit to energize the second main winding means of the second amplifier with alternating supply potential; means energizing the second control winding means in a manner to cause the second amplifier to develop unidirectional potential on the second output mains and to cause the work device connected thereto to be maintained operated after subsequent restoring of the operator switch means; and the timed switch being timed to restore and interrupt energization of the second main winding means of the second amplifier after a time interval to cause the load device to then restore.

References Cited in the file of this patent

UNITED STATES PATENTS

| | | |
|---|---|---|
| 2,027,312 | Fitzgerald | Jan. 7, 1936 |
| 2,299,007 | Bundy | Oct. 13, 1942 |
| 2,519,339 | Avery | Aug. 22, 1950 |
| 2,700,759 | Ogle et al. | Jan. 25, 1955 |